(12) United States Patent
Cook et al.

(10) Patent No.: US 7,703,395 B2
(45) Date of Patent: Apr. 27, 2010

(54) INFLATOR HAVING AN IGNITION NOZZLE

(75) Inventors: Fred J. Cook, Mesa, AZ (US); Halley O. Stevens, Mesa, AZ (US); Darrin L. Johnson, Fountain Hills, AZ (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 386 days.

(21) Appl. No.: 11/055,360

(22) Filed: Feb. 10, 2005

(65) Prior Publication Data

US 2006/0174794 A1    Aug. 10, 2006

(51) Int. Cl.
*C06D 5/00* (2006.01)

(52) U.S. Cl. .................. 102/530; 280/738; 280/742; 280/743.1

(58) Field of Classification Search ............ 102/530; 280/736–740, 742, 743.1
See application file for complete search history.

(56) References Cited

U.S. PATENT DOCUMENTS

| | | | | |
|---|---|---|---|---|
| 3,630,150 | A | * | 12/1971 | Rakowsky ............ 102/205 |
| 3,630,151 | A | * | 12/1971 | Rakowsky ............ 102/202 |
| 3,632,133 | A | * | 1/1972 | Hass .................... 280/738 |
| 3,807,755 | A | | 4/1974 | Mason, Jr. |
| 4,033,267 | A | * | 7/1977 | Morris et al. .......... 102/205 |
| 4,690,063 | A | | 9/1987 | Granier et al. |
| 5,388,859 | A | | 2/1995 | Fischer et al. |
| 5,423,570 | A | | 6/1995 | Kort et al. |
| 5,443,286 | A | | 8/1995 | Cunningham et al. |
| 5,768,885 | A | | 6/1998 | Johnson et al. |
| 5,820,160 | A | | 10/1998 | Johnson et al. |
| 5,931,496 | A | | 8/1999 | Brede et al. |
| 6,019,389 | A | * | 2/2000 | Burgi et al. ............ 280/736 |
| 6,142,516 | A | | 11/2000 | O'Loughlin et al. |
| 6,237,950 | B1 | | 5/2001 | Cook et al. |
| 6,629,703 | B2 | | 10/2003 | Horton et al. |
| 7,178,831 | B2 | | 2/2007 | Yoshida et al. |
| 2003/0173761 | A1 | * | 9/2003 | Rink et al. ............ 280/736 |
| 2005/0146123 | A1 | | 7/2005 | Bergmann et al. |

FOREIGN PATENT DOCUMENTS

DE    20319564    5/2004

* cited by examiner

*Primary Examiner*—Troy Chambers
(74) *Attorney, Agent, or Firm*—Tarolli, Sundheim, Covell & Tummino LLP

(57) ABSTRACT

An inflator (10) includes a container (12) having a chamber (120). An exit opening (48) is provided in the container (12) and is connected to the chamber (120). A substance (122, 180) is stored in the chamber (120) and is responsive to heat for providing inflation fluid. An igniter (130) is associated with the container (12) and is actuatable to provide combustion products for heating the substance (122, 180). A nozzle (80) is interposed between the igniter (130) and the chamber (120). A passage (90) extends from the igniter (130) and through the nozzle (80). The passage (90) includes a divergent portion (110) for focusing a flow of combustion products from the igniter (130) into the chamber (120).

15 Claims, 3 Drawing Sheets

INFLATOR HAVING AN IGNITION NOZZLE

TECHNICAL FIELD

The present invention relates to an inflator, and particularly, to an inflator for use in inflating an inflatable vehicle occupant protection device.

BACKGROUND OF THE INVENTION

FIGS. 5 and 6 illustrate a known inflator 500 for inflating an inflatable vehicle occupant protection device. The inflator 500 include includes a container 502 that is formed from a cylindrical member 504, a diffuser endcap 506, and an igniter endcap 508. A chamber 510 is defined in the container 502. A gaseous propellant 512 is stored in the chamber 510. The gaseous propellant 512 is ignitable for providing inflation fluid.

A flow opening 518 extends through the diffuser endcap 506. A rupturable burst disk 520 closes the flow opening 518 for maintaining the gaseous propellant 512 in the chamber 510.

A through-hole 524 extends through the igniter endcap 508. The through-hole 524 narrows slightly at an end adjacent the chamber 510. A rupturable burst disk 526 closes an opening of the through-hole 524 adjacent the chamber 510.

An igniter 530 is secured to the igniter endcap 508. The igniter 530 is actuatable for providing combustion products for igniting the gaseous propellant 512 in the chamber 510.

FIG. 6 illustrates the inflator 500 in an actuated condition. When the igniter 530 is actuated, combustion products generated from ignition of the igniter 530 fill the through-hole 524 of the igniter endcap 508 and rupture the burst disk 526. When the burst disk 526 ruptures, the combustion products flow from the through-hole 524 into the chamber 510. When the combustion products enter the chamber 524, the combustion products are at a pressure that is higher than the pressure of the gaseous propellant 512 within the chamber 510. As a result, upon entering the chamber 510, the combustion products fan outwardly in a radial direction relative to a central axis of the through-hole 524. The outward fanning of the combustion products results in a generally conical flow pattern for the combustion products, as is illustrated at 534 in FIG. 6.

When the flow opening 518 for inflation fluid is located on an opposite end of the container 502 from the igniter 530, as is illustrated in FIGS. 5 and 6, the outward fanning of the combustion products results in a burn zone that is located adjacent the igniter endcap 508 and away from the flow opening 518. As a result, when the burst disk 520 covering the flow opening 518 is ruptured, some of the gaseous propellant 512 may exit the chamber 510 through the flow opening without being combusted.

To help minimize the amount of uncombusted gaseous propellant 512 exiting the chamber 510 through the flow opening 518, a high burn efficiency is desired. A higher burn efficiency may be achieved by locating the burn zone closer to the flow opening.

SUMMARY OF THE INVENTION

The present invention relates to an inflator that comprises a container having a chamber. An exit opening is provided in the container. The exit opening connects to the chamber. A substance is stored in the chamber. The substance is responsive to heat for providing inflation fluid. An igniter is associated with the container and is actuatable to provide combustion products for heating the substance. The inflator also comprises a nozzle that is interposed between the igniter and the chamber. A passage extends from the igniter and through the nozzle. The passage includes a divergent portion for focusing a flow of combustion products from the igniter into the chamber.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENT

Figure 1:
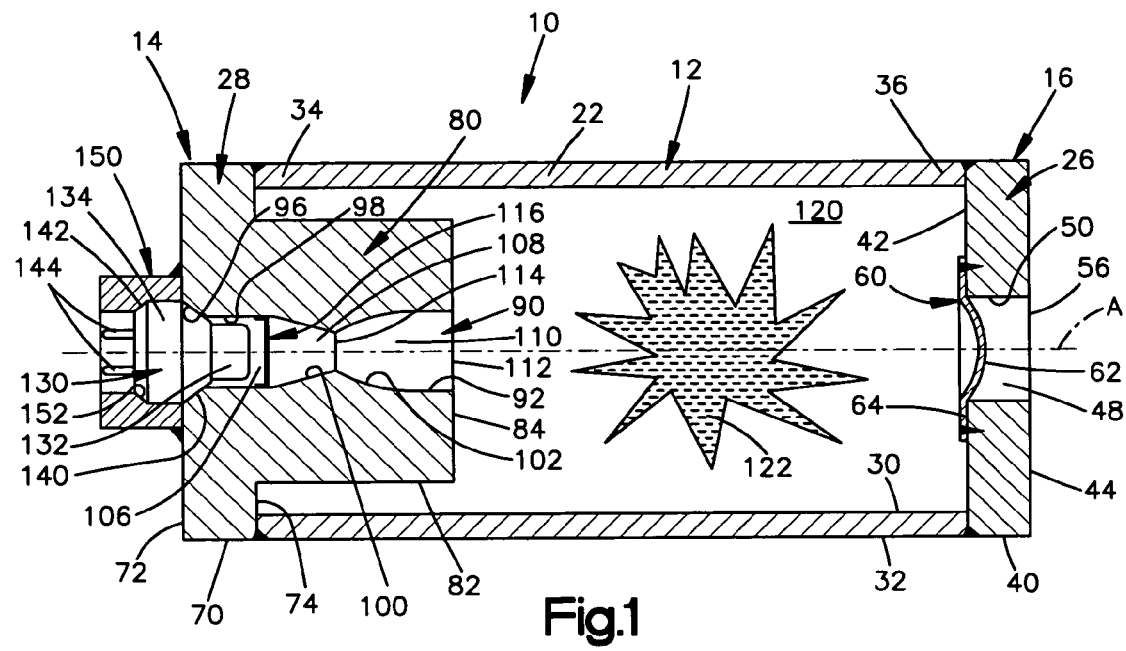
FIG. 1 is a sectional view of an inflator constructed in accordance with a first embodiment of the present invention and prior to actuation of an igniter.

FIG. 1 is a sectional view of an inflator 10 constructed in accordance with a first embodiment of the present invention. The inflator 10 of FIG. 1 includes a container 12 having axially opposite first and second ends 14 and 16, respectively.

The container 12 includes a tubular body portion 22, a diffuser endcap 26, and an igniter endcap 28. The body portion 22 includes cylindrical inner and outer surfaces 30 and 32, respectively. Both of the inner and outer surfaces 30 and 32 are centered on axis A. The body portion 22 also includes first and second open ends 34 and 36, respectively. The first open end 34 is located near the first end 14 of the container 12 and the second open end 36 is located near the second end 16 of the container.

Figure 2:
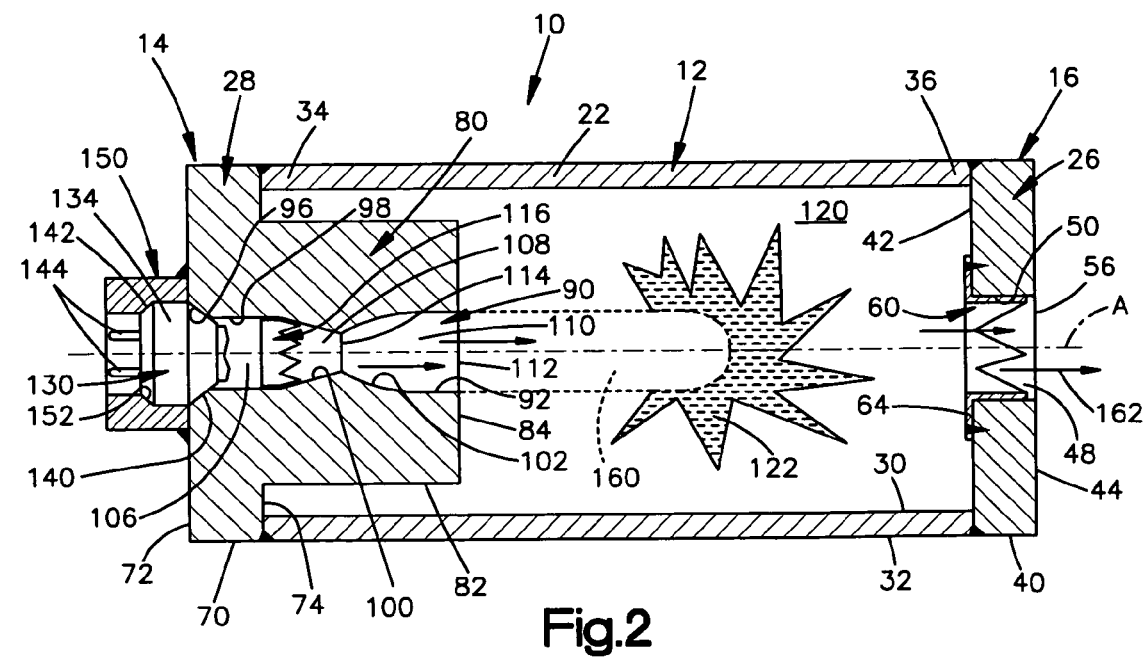
FIG. 2 illustrates the inflator of FIG. 1 after actuation of the igniter and after rupturing of a burst disk of the inflator.

The diffuser endcap 26 includes a cylindrical outer surface 40 and first and second radially extending side surfaces 42 and 44, respectively. The cylindrical outer surface 40 is centered on axis A and has a diameter that is approximately equal to the diameter of the outer surface 32 of the body portion 22. The first side surface 42 of the diffuser endcap 26 is fixed to the second open end 36 of the body portion 22. FIGS. 1 and 2 illustrate the diffuser endcap 26 welded to the body portion 22.

A flow passage 48 extends axially through the diffuser endcap 26 from the first side surface 42 to the second side surface 44. The flow passage 48 is centered on axis A. A cylindrical surface 50 of the diffuser endcap 26 defines the flow passage 48. The flow passage 48 forms a first circular opening (not shown) on the first side surface 42 of the diffuser endcap 26 and a second circular opening 56 on the second side surface 44 of the diffuser endcap 26.

A burst disk 60 closes the flow passage 48 of the diffuser endcap 26. The burst disk has a domed central portion 62 and a radially outwardly extending flange portion 64. The flange portion 64 of the burst disk is affixed to the first side surface 42 of the diffuser endcap 26. FIGS. 1 and 2 illustrate the flange portion 64 of the burst disk 60 welded to the first side surface 42. When the flange portion 64 of the burst disk 60 is affixed to the first side surface 42 of the diffuser endcap 26, the domed central portion 62 of the burst disk 60 closes the flow passage 48. The domed central portion 62 of the burst disk 60 is designed to rupture when subjected to a pressure differential of a predetermined amount.

The igniter endcap 28 includes a cylindrical outer surface 70 and first and second radially extending side surfaces 72 and 74, respectively. The cylindrical outer surface 70 is centered on axis A and has a diameter that is approximately equal to the diameter of the outer surface 32 of the body portion 22. The second side surface 74 of the igniter endcap 28 is fixed to the first open end 34 of the body portion 22. FIGS. 1 and 2 illustrate the second side surface 74 of the igniter endcap 28 welded to the first open end 34 of the body portion 22.

The inflator 10 also includes a nozzle 80. FIGS. 1 and 2 illustrate the nozzle 80 as being formed as one piece with the igniter endcap 28 and not from separate pieces secured together. Alternatively, the nozzle 80 may be formed as a separate piece from the igniter endcap 28 and subsequently fixed to the igniter endcap.

The nozzle 80 extends outwardly from the second side surface 74 of the igniter endcap 28. The nozzle 80 includes a cylindrical outer surface 82 that has a diameter that is less than the diameter of the inner surface 30 of the body portion 22. As shown in FIG. 1, the nozzle 80 extends into the body portion 22 from the first open end 34. The nozzle 80 terminates at an end surface 84. The end surface 84 extends in a direction perpendicular to axis A.

A passage 90 extends axially through the igniter endcap 28 and the nozzle 80. An uninterrupted surface 92 defines the passage 90 along its entire axial length between the first side surface 72 of the igniter endcap 28 and the end surface 84 of the nozzle 80. The uninterrupted surface 92 includes a beveled portion 96, a cylindrical portion 98, a tapered portion 100, and a curved portion 102. The beveled portion 96 and the cylindrical portion 98 of the surface 92 collectively define a generally cylindrical portion 106 of the passage 90. The cylindrical portion 106 of the passage 90 is associated with the igniter endcap 28. The tapered portion 100 of the surface 92 defines a convergent portion 108 of the passage 90. The curved portion 102 of the surface 92 defines a divergent portion 110 of the passage 90. The divergent portion of the passage terminates at the end surface 84 of the nozzle 80 with a circular opening 112. The convergent and divergent portions 108 and 110 of the passage 90 are associated with the nozzle 80. A throat 114 of the passage 90 is formed at the location where the convergent portion 108 of the passage 90 and the divergent portion 110 meet.

A burst disk 116 closes the passage 90. The burst disk 116 is located in the cylindrical portion 106 of the passage 90 near the convergent portion 108. The burst disk 116 is secured to the cylindrical portion 98 of the uninterrupted surface 92. The burst disk 116 is designed to rupture when subjected to a pressure differential of a predetermined amount.

A chamber 120 is located within the container 12. A fluid 122 is stored in the chamber 120. The fluid 122 in the chamber 120 of the inflator 10 of FIGS. 1 and 2 is a combustible mixture of gases. The combustible gas mixture 122 is stored under pressure in the chamber 120. The pressure of the combustible gas mixture 122 is approximately 6,000 psi (pounds per square inch). The combustible gas mixture 122 preferably includes an inert gas, hydrogen, and oxygen. Trace amounts of helium may be added to the combustible gas mixture to aid in leak detection. When heated beyond a predetermined temperature, the combustible gas mixture 122 combusts. Combustion of the combustible gas mixture 122 heats the inert gas. The heated inert gas is an inflation fluid.

As an alternative to the combustible gas mixture 122, the fluid stored in the chamber 120 may be a combustible liquid that is combusted when heated beyond the predetermined temperature or a liquid that experiences gasification upon being heated beyond a predetermined temperature. A refrigerant, for example, Freon, is an example of a liquid that experiences gasification when heated beyond a predetermined temperature. As a further alternative, the fluid may undergo decomposition when heated beyond the predetermined temperature. Nitrous oxide is an example of a gas that undergoes decomposition when heated beyond a predetermined temperature.

The inflator 10 also includes an actuatable igniter 130. The igniter 130 includes an actuatable portion 132 (FIG. 1) and a support portion 134. The actuatable portion 132 typically contains a pyrotechnic material (not shown) and a resistive wire (not shown) for igniting the pyrotechnic material. The support portion 134 of the igniter 130 is wider in diameter, relative to axis A, than the actuatable portion 132 and includes opposite tapered end surfaces 140 and 142, respectively, and leads 144 for connecting the igniter to electronic circuitry (not shown) of a vehicle safety system (not shown).

The inflator 10 also includes a support member 150 for supporting the igniter 130 relative to the igniter endcap 28. The support member 150 is generally tubular and includes a frustoconical surface 152. The support member 150 is affixed to the first side surface 72 of the igniter endcap 28 for securing the igniter 130 relative to the igniter endcap. When the igniter 130 is secured relative to the igniter endcap 28, as is shown in FIG. 1, the tapered end surface 140 of the support portion 134 of the igniter 130 abuts the beveled portion 96 of the surface 92 and the tapered end 142 of the support portion abuts the frustoconical surface 152 of the support member 150. Also, when the igniter 130 is secured relative to the igniter endcap 28, the actuatable portion 132 of the igniter 130 is located in the cylindrical portion 106 of the passage 90, as is illustrated in FIG. 1.

The inflator 10 of the present invention is actuatable for providing inflation fluid having a low concentration of the combustible gas mixture 122. To actuate the inflator 10, an electrical signal is sent to the igniter 130. When the igniter 130 receives the electrical signal, the igniter 130 is actuated, i.e., the pyrotechnic material of the actuatable portion 132 of the igniter is ignited.

Actuation of the igniter 130 produces combustion products. The combustion products result from ignition of the pyrotechnic material of the actuatable portion 132 of the igniter 130. The combustion products fill the cylindrical portion 106 of the passage 90 between the igniter 130 and the burst disk 116, and pressure from the combustion products acts on the burst disk. The combustion products from actuation of the igniter 130 may reach a pressure of approximately 14,000 psi. Since the burst disk 116 is subjected to pressure from the chamber 120 of approximately 6,000 psi, the pressure from the combustion products is sufficient to rupture the burst disk 116.

When the burst disk 116 ruptures, the combustion products begin to flow through the passage 90 toward the chamber 120. The combustion products flow from the higher pressure cylindrical portion 106 of the passage 90 toward the lower pressure chamber 120. The pressure of combustion products in the higher pressure cylindrical portion 106 is typically greater than twice the pressure of the lower pressure chamber 120. During the flow toward the chamber 120, the combustion products enter the convergent and divergent portions 108 and 110 of the passage 90. As the combustion products flow through the convergent portion 108 of the passage 90 toward the chamber 120, the flow area of the passage decreases. As a result, the pressure of the combustion products increases and the flow of the combustion products is accelerated. When the flow of the combustion products at the throat 114 of the passage 90 is not choked, the flow of the combustion products through the passage 90 remains subsonic. The flow of the combustion product is choked at the throat 114 when the mass flow of the combustion products through the throat 114 reaches a maximum level for the flow area of the throat. Thus, when the mass flow of the combustion products through the throat 114 of the passage 90 may still be increased, for example, by increasing the pressure differential between the cylindrical portion 106 of the passage and the chamber 120, the flow of the combustion products through the throat 114 is not choked. As a result, the flow of the combustion products through the passage 90 remains subsonic.

After the combustion products pass through the throat 114 of the passage 90, the combustion products enter the divergent portion 110 of the passage 90. As the combustion products flow through the divergent portion 110 of the passage 90 toward the chamber 120, the flow area of the passage increases. During the flow of the combustion products through the divergent portion 110 of the passage 90, the pressure of the combustion products decreases and the flow of the combustion products is accelerated. The pressure of the combustion products decreases in the divergent portion 110 of the passage 90. As a result, the combustion products have a pressure that is approximately equal to the pressure of the combustible gas mixture 122 in the chamber 120 when the combustion products reach the opening 112 at the end of the divergent portion of the passage.

Figure 5:
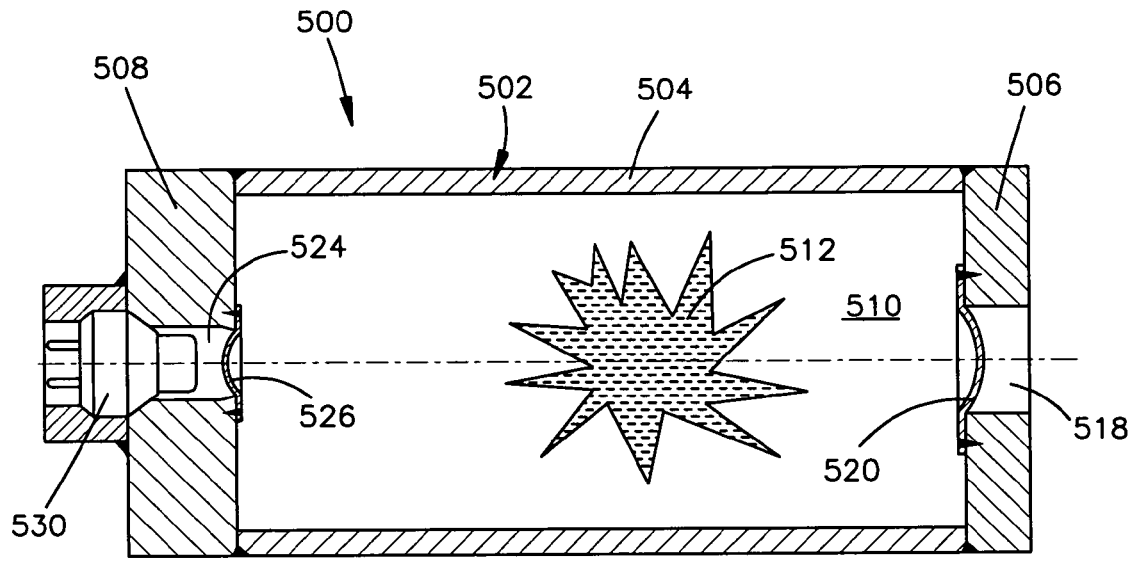
FIG. 5 is a sectional view of a prior art inflator prior to actuation of an igniter.
Figure 6:
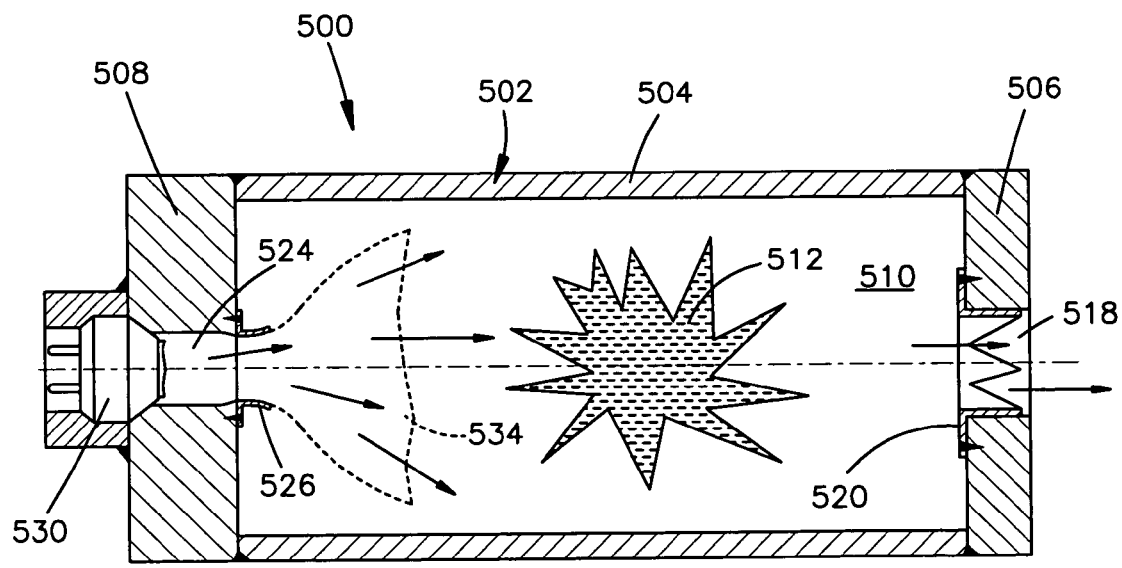
FIG. 6 illustrates the inflator of FIG. 5 after actuation of the igniter and after rupturing of a burst disk of the inflator.

Since the combustion products exiting the passage 90 at the opening 112 have a pressure equal to the pressure within the chamber 120, little to no radial expansion, relative to axis A, of the combustion products occurs upon the combustion products entering the chamber 120. Specifically, upon entering the chamber 120, the flow of combustion products is in a direction parallel to axis A and radial flow is minimized, relative to axis A. As a result, the flow of combustion products from the divergent portion 110 of the passage 90 is said to be focused. FIG. 2 illustrates this focused flow of combustion products at 160. The focused flow of the combustion products into the chamber 120 results in the combustion products traveling at a greater velocity and through a greater axial distance of the chamber 120 as compared to inflators in which radial expansion of the combustion products occurs, as was described with reference to the inflator 500 of FIGS. 5 and 6.

Since the focused flow of the combustion products travels a greater axial distance, the burn zone that results from the combustion products igniting the combustible gas mixture 122 is located nearer the flow passage 48 of the diffuser endcap 26. Generally, the nearer the burn zone is located to the flow passage 48 of the diffuser endcap 26, the greater the quantity of the combustible gas mixture 122 that passes through the burn zone and is combusted prior to exiting the chamber 120. As a result, the inflation fluid provided by the inflator 10 has a lower concentration of the combustible gas mixture 122.

FIG. 2 illustrates the inflator 10 shortly after actuation of the igniter 130 and after rupturing of the burst disks 116 and 60. Arrow 162 in FIG. 2 illustrates inflation fluid having a low concentration of the combustible gas mixture 122 exiting the chamber 120 of the inflator 10 through the flow passage 48.

Figure 3:
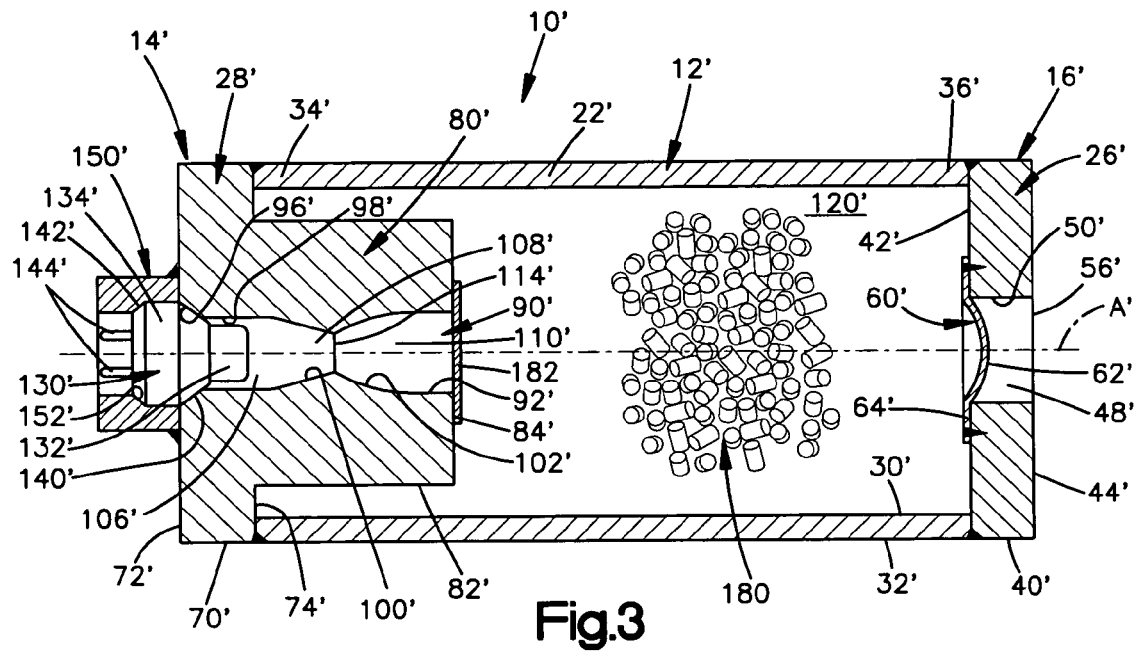
FIG. 3 is a sectional view of an inflator constructed in accordance with a second embodiment of the present invention and prior to actuation of an igniter.

FIG. 3 is a sectional view of an inflator 10' constructed in accordance with a second embodiment of the present invention. Features of the inflator 10' of FIG. 3 that are the same as or similar to those in FIGS. 1 and 2 are labeled with the same reference number with the addition of a prime. Additionally, only the differences between the inflator 10' of FIG. 3 and the inflator 10 of FIGS. 1 and 2 are discussed in detail below.

The inflator 10' of FIG. 1 includes a solid propellant material 180 that is ignitable upon the application of heat. The solid propellant material 180 illustrated in FIG. 1 is in the form of small pellets. The chamber 120' of the container 12' of the inflator 10' is filled with the solid propellant material 180. Since the chamber 120' of the container 12' is not pressurized, there is no need for a burst disk, similar to burst disk 116 of FIG. 1, in the passage 90'. Instead, a foil material 182 may extend over the opening to the passage 90' and may be adhered to the end surface 84' of the nozzle 80'. The foil material 182 prevents the solid propellant material 180 from entering the passage 90'.

Additionally, in the inflator 10' of FIG. 3, the igniter 130' and the passage 90' are designed for providing supersonic flow of the combustion products in the divergent portion 110' of the passage. Supersonic flow of the combustion products in the divergent portion 110' of the passage 90' occurs when the flow of combustion products at the throat 114' is choked. The flow of combustion products at the throat 114' is choked when the mass flow of the combustion products through the throat 114' reaches a maximum level. The mass flow of the combustion products through the throat 114' reaches a maximum level when, for the given flow area of the throat 114', the mass flow of the combustion products through the throat 114' will not increase, even in response an increase in the pressure differential between the cylindrical portion 106' of the passage 90' and the chamber 120'. Given data regarding the combustion products produced by actuation of the igniter 130' and the pressure within the chamber 120', one of ordinary skill in the art of nozzles will be able to determine the appropriate flow area for the throat 114' of the passage 90' for causing choking.

When the flow of the combustion products at the throat 114' is choked, the flow speed of the combustion products at the throat 114' equals the speed of sound, i.e., Mach 1. A region of supersonic flow forms just downstream of the throat 114' in the divergent portion 110' of the passage 90'. The region of supersonic flow is terminated by the occurrence of either a normal shock wave or shock patterns. The region of supersonic flow may terminate within the divergent portion 110' of the passage 90' or may terminate in the chamber 120' downstream of the divergent portion 110' of the passage 90'. The location at which the region of supersonic flow terminates is a function of pressure difference between the combustion products in the cylindrical portion 106' of the passage 90' and the pressure in the chamber 120'. Controlling the location at which a region of supersonic flow terminates is well known to those of ordinary skill in the art of nozzles.

When the region of supersonic flow terminates in the divergent portion 110' of the passage 90', a normal shock wave occurs. A normal shock wave involves a near instantaneous deceleration of the flow of combustion products to a subsonic speed. After the normal shock wave, the subsonic flow of combustion fluid decelerates through the remainder of the divergent portion 110' and exits the passage 90' as a focused flow of combustion products, as was discussed with reference to FIG. 2.

Figure 4:
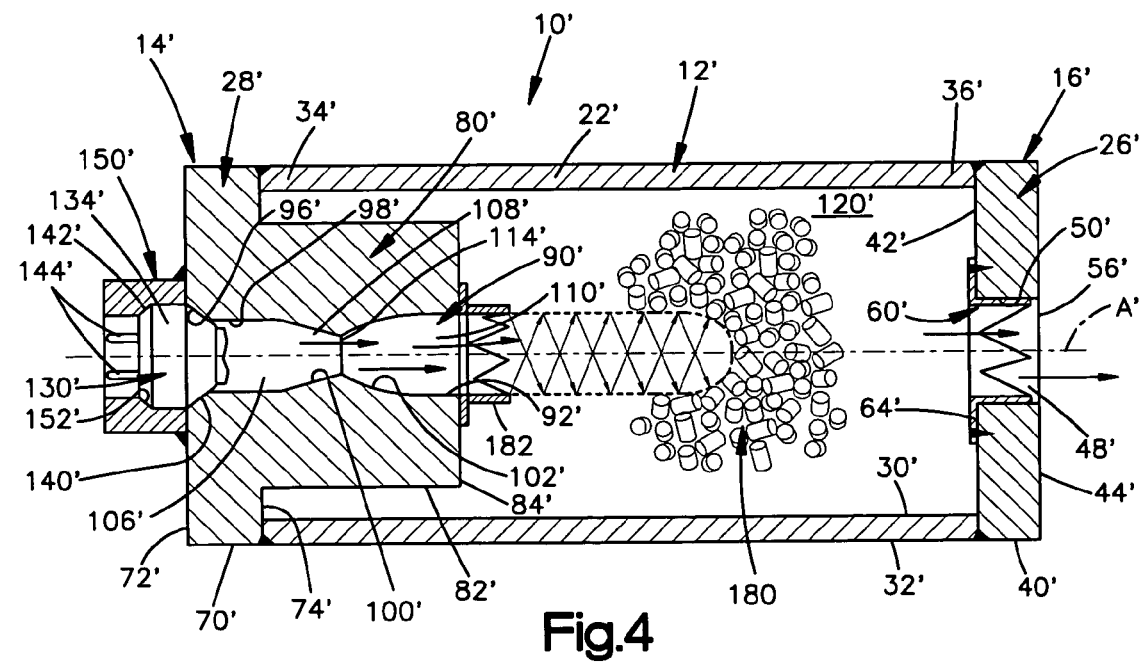
FIG. 4 illustrates the inflator of FIG. 3 after actuation of the igniter and after rupturing of a burst disk of the inflator.

When the region of supersonic flow terminates in the chamber 120' downstream of the divergent portion 110' of the passage 90', a complex pattern of shocks and reflections is formed in the focused flow of combustion products that exits the passage 90'. The complex pattern of shocks and reflections typically involves a mixture of subsonic and supersonic flows. FIG. 4 schematically illustrates the complex pattern of shocks and reflections as shock diamonds that are located in the focused flow of combustion products exiting the passage 90'.

Providing supersonic flow of the combustion products through the divergent portion 110' of the passage 90' in the nozzle 80' increases the distance into the chamber 120' that the combustion products travel. As a result, the burn zone formed from ignition of the solid propellant material 180 is located nearer the flow passage 48' of the diffuser endcap 26'. Additionally, the higher speed of the combustion products yields a higher heat transfer rate to the surfaces of the solid propellant material 180 to improve ignition of the solid propellant material. The normal shock wave or the shock patterns resulting from the termination of the supersonic flow may be used to pulverize some of the solid propellant material 180 so as to increase the burn surface area of the solid propellant material.

FIG. 4 illustrates the inflator 10' shortly after actuation of the igniter 130' and after rupturing of the foil material 182 and the burst disk 60'. Inflation fluid formed from combustion of the solid propellant material 180 exits the chamber 120' of the inflator 10' through the flow passage 48'.

From the above description of the invention, those skilled in the art will perceive improvements, changes and modifications. For example, the convergent and divergent passages 108 and 110 and the throat 114 of the nozzle 80 of the inflator 10 of FIGS. 1 and 2 may also be designed for enabling supersonic flow of the combustion products. Also, the chamber 120' of the container 12' of FIGS. 3 and 4 may be pressurized with a stored gas. When the chamber 120' is pressurized with a stored gas, a burst disk similar to the burst disk 116 of FIG. 1 may be used in the passage 90' to prevent the loss of pressure from the chamber 120'. Such improvements, changes, and modifications within the skill of the art are intended to be covered by the appended claims.

Having described the invention, we claim the following:

1. An inflator comprising:
   a container having a chamber, an exit opening provided in the container and connecting to the chamber;
   a substance stored in the chamber, the substance being responsive to heat for providing inflation fluid;
   an igniter associated with the container and actuatable to provide combustion products for heating the substance; and
   a nozzle for directing a flow of combustion products from the igniter into the chamber to ignite the substance in the chamber, the nozzle comprising a passage including a convergent portion and a divergent portion for focusing the flow of combustion products parallel to a longitudinal axis and helping to prevent radial expansion of the flow relative to the axis.

2. The inflator of claim 1 wherein a nozzle opening connects the divergent portion of the passage and the chamber, the combustion products having have a pressure at the nozzle opening that is approximately equal to a pressure within the chamber adjacent the nozzle opening.

3. The inflator of claim 2 wherein the convergent portion is located immediately upstream of the divergent portion, the flow of combustion products being accelerated in the convergent portion of the passage.

4. The inflator of claim 3 wherein a throat of the passage separates the convergent and divergent portions, the flow of combustion products reaching the speed of sound at the throat and forming a region of supersonic flow within the divergent portion of the passage immediately downstream of the throat.

5. The inflator of claim 4 wherein the region of supersonic flow terminates within the chamber, the region of supersonic flow terminating with a shock pattern.

6. The inflator of claim 5 wherein the substance stored in the chamber for providing inflation fluid when heated is a solid propellant, the combustion products from the igniter igniting the solid propellant so as to provide inflation fluid.

7. The inflation of claim 6 wherein the shock pattern acts to pulverize some of the solid propellant so as to aid in the ignition of the solid propellant.

8. The inflator of claim 6 wherein a rupturable material extends over the nozzle opening that connects the divergent portion of the passage and the chamber, the rupturable material preventing the solid propellant from entering the passage, the flow of combustion products from the igniter rupturing the rupturable material.

9. The inflator of claim 2 wherein the substance stored in the chamber for providing inflation fluid when heated is a stored gas under pressure, a burst disk being located in the passage for isolating the igniter from pressure of the stored gas.

10. The inflator of claim 9 wherein the stored gas under pressure is a combustible mixture of gases, combustion products from the igniter igniting the combustible mixture of gases.

11. The inflator of claim 1 wherein the inflator includes an igniter endcap for supporting the igniter, the nozzle being formed as one piece with the igniter endcap and not from separate pieces secured together, the passage extending through the igniter endcap and the nozzle and being formed by a single, uninterrupted surface.

12. The inflator of claim 1 wherein a throat of the passage separates the convergent and divergent portions, the flow of combustion products reaching the speed of sound at the throat and forming a region of supersonic flow within the divergent portion of the passage immediately downstream of the throat, the region of supersonic flow terminating with one of a shock wave or a shock pattern.

13. The inflator of claim 1 wherein an igniter endcap and a diffuser endcap form opposite ends of the container, the igniter endcap supporting the igniter and the diffuser endcap including the exit opening through which inflation fluid may exit the chamber, the nozzle being associated with the igniter endcap and focusing the flow of combustion products toward the diffuser endcap.

14. The inflator of claim 1 wherein the passage includes a cylindrical portion located between the divergent portion and the chamber.

15. An inflator comprising:
   a container having a chamber;
   a combustible material stored in the chamber, the combustible material being responsive to heat to generate inflation fluid;
   an igniter positioned at a first end of the chamber, the igniter being actuatable to provide combustion products that heat the combustible material;
   an exit opening positioned at a second end of the chamber, opposite the first end of the chamber; and
   a convergent-divergent nozzle for directing a flow of combustion products from the igniter into the chamber to ignite the combustible material, the nozzle focusing the flow of combustion products parallel to a longitudinal axis of the inflator and helping to prevent radial expansion of the flow relative to the longitudinal axis to help move a burn zone of the inflator toward the exit opening, thereby helping to prevent non-ignited combustible materials from being discharged through the exit opening.

* * * * *